United States Patent
Smit et al.

(10) Patent No.: US 9,713,337 B2
(45) Date of Patent: Jul. 25, 2017

(54) USE OF HIGH PRESSURE PROCESSING TO IMPROVE MUSCLE QUALITY BY INHIBITING POST MORTEM GLYCOLYSIS

(75) Inventors: Nathan Ryan Smit, Albert Lea, MN (US); John William Summerfield, Austin, MN (US); Jerry Earl Cannon, Austin, MN (US)

(73) Assignee: HORMEL FOODS CORPORATION, Austin, MN (US)

( * ) Notice: Subject to any disclaimer, the term of this patent is extended or adjusted under 35 U.S.C. 154(b) by 767 days.

(21) Appl. No.: 12/545,189

(22) Filed: Aug. 21, 2009

(65) Prior Publication Data

US 2010/0048116 A1 Feb. 25, 2010

Related U.S. Application Data

(60) Provisional application No. 61/090,703, filed on Aug. 21, 2008.

(51) Int. Cl.
| | |
|---|---|
| *A22C 9/00* | (2006.01) |
| *A23B 4/00* | (2006.01) |
| *A23L 3/015* | (2006.01) |
| *A23L 13/00* | (2016.01) |

(52) U.S. Cl.
CPC ............. *A23B 4/00* (2013.01); *A22C 9/00* (2013.01); *A23L 3/0155* (2013.01); *A23L 13/03* (2016.08); *A23V 2002/00* (2013.01)

(58) Field of Classification Search
USPC .......................................... 452/52, 141, 198
See application file for complete search history.

(56) References Cited

U.S. PATENT DOCUMENTS

| | | | | |
|---|---|---|---|---|
| 2,830,912 A | * | 4/1958 | Simjian | 426/238 |
| 3,492,688 A | * | 2/1970 | Godfrey | 452/141 |
| 3,711,896 A | * | 1/1973 | Guberman et al. | 452/141 |
| 5,256,430 A | * | 10/1993 | Suzuki et al. | 426/237 |
| 5,328,403 A | * | 7/1994 | Long | 452/141 |
| 5,588,357 A | * | 12/1996 | Tomikawa et al. | 99/451 |
| 5,823,867 A | * | 10/1998 | Roth et al. | 452/138 |
| 6,120,818 A | * | 9/2000 | Long | 426/238 |
| 6,146,262 A | * | 11/2000 | Long et al. | 452/141 |
| 6,168,814 B1 | * | 1/2001 | Long | 426/238 |

(Continued)

FOREIGN PATENT DOCUMENTS

| | | |
|---|---|---|
| JP | 04-335873 | 11/1992 |
| JP | 05-049391 | 3/1993 |

(Continued)

OTHER PUBLICATIONS

Bouton, P.E., Harris, P.V., Macfarlane, J.J., O'Shea, J.M. Effect fo pressure treatments on the mechanical properties of pre- and post-rigor meat. Meat Science. 1977b;1(4):307-318.*

(Continued)

*Primary Examiner* — David Parsley
(74) *Attorney, Agent, or Firm* — Dicke, Billig & Czaja, PLLC

(57) ABSTRACT

A method of processing meat is disclosed. The method includes subjecting the meat (pork or turkey) to high pressure processing at a pressure of at least 175 MPa for a time of 20 minutes or less, wherein post mortem glycolysis is inhibited. For beef, a pressure of at least 200 MPa and a hold time of from 30 seconds to 20 minutes are used.

20 Claims, 18 Drawing Sheets

(56) References Cited

U.S. PATENT DOCUMENTS

| | | | |
|---|---|---|---|
| 6,206,773 B1* | 3/2001 | Waits | 452/141 |
| 6,264,543 B1* | 7/2001 | Garcia et al. | 452/141 |
| 6,306,029 B1* | 10/2001 | Long | 452/141 |
| 6,393,977 B1* | 5/2002 | Voisin | 99/467 |
| 6,669,546 B2* | 12/2003 | Long | 452/141 |
| 7,220,381 B2* | 5/2007 | Ting et al. | 422/1 |
| 7,244,459 B2* | 7/2007 | Long et al. | 426/238 |
| 2009/0232959 A1 | 9/2009 | McKenna | |

FOREIGN PATENT DOCUMENTS

| | | |
|---|---|---|
| JP | 10-014537 | 1/1998 |
| WO | WO 00/15053 A1 | 3/2000 |

OTHER PUBLICATIONS

MacFarlane, J. J. et al., Pressure-Induced pH and Length Changes in Muscle. Meat Science, vol. 7, 1982, pp. 169-181.

Buckow, R., Effect of Combined High Pressure-Temperature Treatments on the Sensory and Microbial Quality of Pork and Poultry Meat. Food Science Australia, 074-04, Abstract only.

Cheftel, J. Claude et al., Effects of High Pressure on Meat: A Review. Meat Science, vol. 46, No. 3, 1997, pp. 211-236.

De Cordt, S. et al., Enzyme Stability Under High Pressure and Temperature. High Pressure Bioscience and Biotechnology, 1996, pp. 203-208.

Horgan, Douglas et al., Effect of High Pressure on the Regulation of Phosphorylase Activity in Pre-rigor Rabbit Muscle. Meat Science, vol. 8, 1983, pp. 65-77.

Kunugi, Shigeru, Enzyme Reactions Under High Pressure and Their Applications. Annals New York Academy of Sciences, pp. 293-304.

MacFarlane, J. J. et al., Effects of Pressure Treatment on the Ultrastructure of Striated Muscle. Meat Science, vol. 2, 1978, pp. 281-288.

MacFarlane, J. J., Pre-rigor Pressurization of Muscle: Effects on pH, Shear Value and Taste Panel Assessment. Journal of Food Science, vol. 38, 1973, pp. 294-298.

Mozhaev, V. V. et al., Modulation of Enzyme Activity and Stability by High Pressure: α-chymotrypsin. High Pressure Bioscience and Biotechnology, 1996, pp. 221-226.

Scheffler, T. L. et al., Mechanisms Controlling Pork Quality Development: The Biochemistry Controlling Postmortem Energy Metabolism. Meat Science, vol. 77, 2007, pp. 7-16.

Ananth, V. et al., "Shelf Life Extension and Safety of Fresh Pork Treated with High Hydrostatic Pressure", Journal of Food Protection, vol. 58, p. 8, (Abstract only—1 page) (1995).

Bai, Y. et al., "Changes of Microscopic Structure and Shear Force Value of Bovine and Mutton Skeletal Muscle Under Hydrostatic High-Pressure (HHP) Treatment", Food Science, China, vol. 25, No. 9, pp. 27-31, (Abstract only—1 page) (2004).

Hong, G. et al., "Effects of Time-Dependent High Pressure Treatment on Physico-chemical Properties of Pork", Food Science and Biotechnology, vol. 14, No. 6, pp. 808-812 (2005).

Jun, Y. et al., "Effects of High Pressure Treatment on Sensory Properties in Beef", Meat Research, College of Food Science, China Agric. Univ., Beijing, China (Abstract only—1 page) (1999).

Jung, S. et al., "Influence of High Pressure on the Color and Microbial Quality of Beef Meat", Swiss Society of Food Science and Technology, vol. 36, pp. 625-631 (2003).

Jun, Y. et al., "Effects of High Pressure Treatment on Sensory Properties in Beef", Meat Research, College of Food Science, China Agric. Univ., Beijing, China 100094) (9 pages) (1999).

Horgan, Douglas J. et al., "Effect of High Pressure on the Regulation of Phosphorylase Activity in Pre-rigor Rabbit Muscle", Meat Science, 1983, pp. 65-77, vol. 8, Applied Science Publishers Ltd, England. Printed in Great Britain.

MacFarlane, J.J. et al., "Pressure-Induced pH and Length Changes in Muscle", Meat Science, 1982, pp. 169-181, vol. 7, Applied Science Publishers Ltd, England. Printed in Great Britain.

English translation of JP 10-014537, 17 pages.

* cited by examiner

USE OF HIGH PRESSURE PROCESSING TO IMPROVE MUSCLE QUALITY BY INHIBITING POST MORTEM GLYCOLYSIS

This application claims the benefit under 35 U.S.C. §119 (e) of U.S. Provisional Patent Application No. 61/090,703, filed Aug. 21, 2008, and entitled "Use of High Pressure Processing to Improve Muscle Quality by Inhibiting Post Mortem Glycolysis."

BACKGROUND OF THE INVENTION

1. Field of the Invention

This invention relates generally to the use of high pressure processing to improve muscle quality and more particularly to the use of high pressure processing to improve muscle quality by inhibiting post mortem glycolysis.

2. Description of the Prior Art

Muscle quality is essential for maintaining consumer demand for meat, i.e. pork, turkey, chicken and beef. Ideal muscle quality is defined as a combination of appearance, taste, nutritional value and wholesomeness. Specifically, meat processors have focused improvement opportunities around pH, water holding capacity and meat color.

Muscle with higher 24-hour pH has increased yield and water holding capacity, as well as improved color, tenderness and juiciness. On the other hand, muscle with low 24-hour pH has the condition known as pale, soft and exudative (PSE) meat, which is associated with product that is tough, dry, has excessive purge, poor yield and poor visual appeal.

Muscle quality is influenced by the combination of many factors. To date, no one single factor can be attributed to defining muscle quality. These factors include genetics, nutrition, animal handling, stunning and chilling. Various interventions within these factors have focused on controlling the rate and extent of pH decline as well as the rate of temperature decline. Many processors have settled on combinations of these interventions to optimize muscle quality (typically measured by 24-hour pH).

SUMMARY OF THE INVENTION

In one embodiment the invention is a method of processing meat. The method includes subjecting meat to high pressure processing at a pressure of at least 175 MPa for a time of 20 minutes or less, wherein post mortem glycolysis is inhibited.

In another embodiment, the invention is a method of processing pork comprising subjecting the pork to high pressure processing at a pressure of at least 175 MPa for a time of 20 minutes or less, wherein post mortem glycolysis is inhibited.

In another embodiment, the invention is a method of processing turkey. The method includes subjecting the turkey to a high pressure processing at a pressure of at least 175 MPa for a time of 20 minutes or less, wherein post mortem glycolysis is inhibited.

In another embodiment, the invention is a method of processing beef. The method includes subjecting the beef to high pressure processing at a pressure of at least 250 MPa for a time of 20 minutes or less, wherein post mortem glycolysis is inhibited.

In another embodiment, the invention is a method of processing beef. The method includes placing a beef carcass or a portion thereof in a high pressure processing vessel and subjecting the beef carcass or a portion thereof to a pressure of 325 MPa or greater for a hold time of 15 seconds or greater.

DETAILED DESCRIPTION OF A PREFERRED EMBODIMENT

Figure 1:
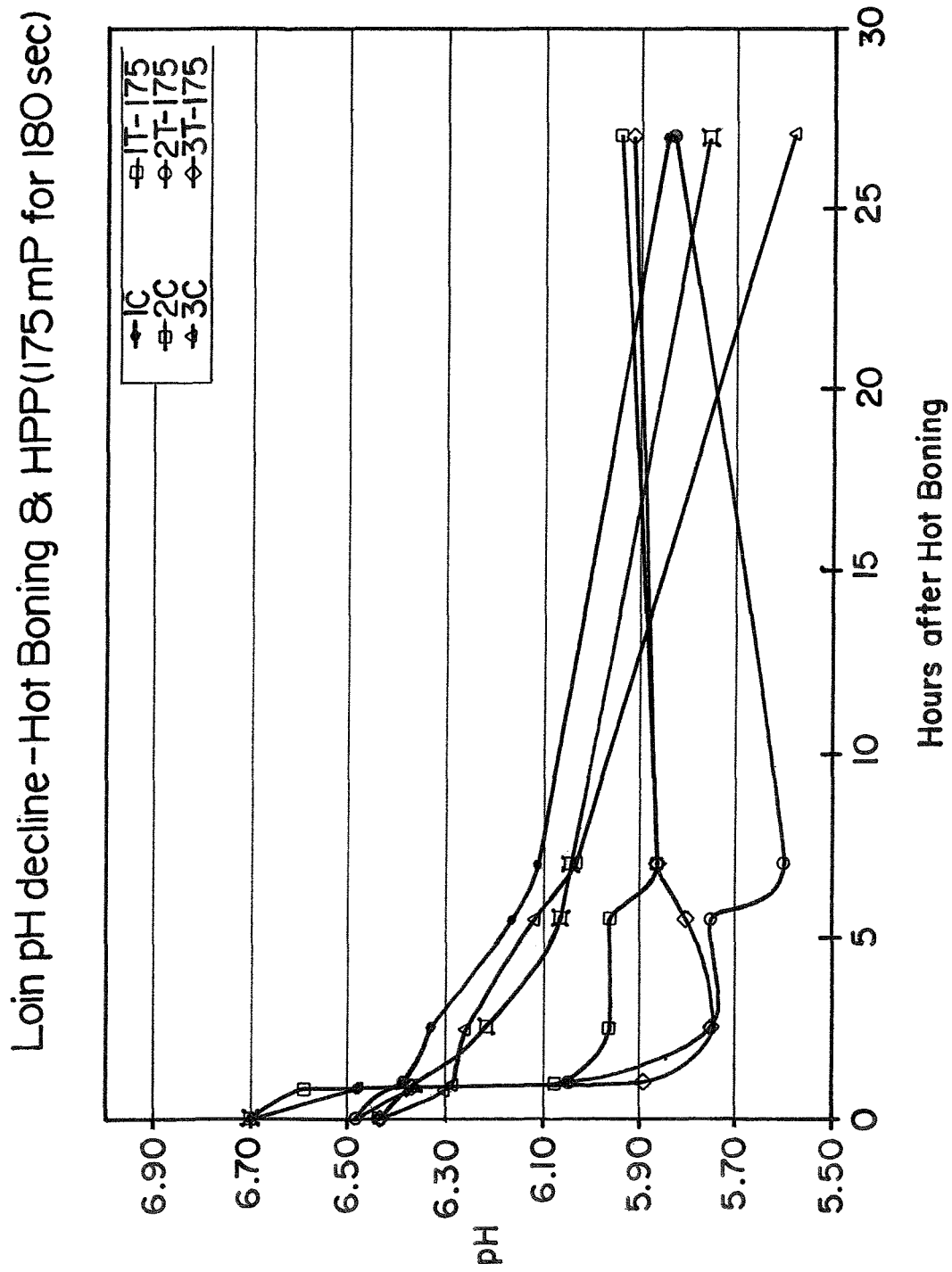
FIG. 1 is a graph showing the pH decline of pork loins high pressure processed at 175 MPa for 180 seconds.

The present invention utilizes a method that high pressure processes pre-rigor muscle. The muscle may be pork, turkey or other meat such as chicken or beef. Any suitable apparatus may be utilized to provide the high pressure processing (HPP). One example of such an apparatus is NC Hyperbaric Wave 300. The invention is performed on pre-rigor meat prior to pH decline that results from post mortem glycolysis. It is important to stop glycolysis quickly post mortem so that the muscle pH does not significantly decrease, preferably while muscle temperature is still high, i.e. greater than 65° F., preferably greater than 85° F., and more preferably greater than 90° F. It is desired to prevent low pH at high temperatures. Because the combination of low muscle pH and high temperature will cause the myofibular and sarcoplasmic (myoglobin) proteins to denature leading to poor water holding capacity and pale color. The high pressure processing of pre-rigor pork should be done within 8 hours of "effective post mortem", 8 hours for turkey and 24 hours for beef. For other meat species, the time within which to high pressure process will be dependent on the rate of post mortem glycolysis.

It has also been found that extended HPP hold times in the prior art will cause myofibular and myoglobin protein denaturation. The prior art has shown that pressures above 150 MPa (megapascals) for hold times longer than 15 to 20 minutes results in protein denaturation, for post-rigor meat. The quality characteristics of such a product would be very poor and have a cooked appearance.

The present invention provides for a window of HPP pressures and hold times along with the window of muscle characteristics that are processed. The main muscle characteristics are the pH and temperature of the meat. The muscle characteristics for the pork for optimal results would be pork with an initial pH of above 5.8 and a temperature above 65°. The optimal processing window for pork for HPP hold pressures is from 175 to 275 MPa and a hold time of 20 minutes or less. Preferably, the pressure is at least 180 MPa, more preferably from 190 to 225 MPa and most preferably from 190 to 220 MPa. The times for which the pressure is maintained is 20 minutes or less, preferably 10 minutes or less, more preferably 5 minutes or less, and more preferably 1 minutes or less. It has been found that the optimum conditions for the pork is approximately 215 MPa and a hold time of 15 seconds. It is understood that with respect to the high pressure processing there is a period of time that it takes to pressurize the vessel. For instance, in the tests that are to be discussed more fully hereafter, it takes approximately 1½ minutes (ramp up time) to increase the pressure to the desired pressure. The release (decompression) time is less, and is typically approximately 5 seconds. Therefore, when a hold time is discussed as 1 minute or less, the time refers to the time where the high pressure processing is at the final desired pressure. For processing in a manufacturing setting, it would be desired to have the ramp up time to be minimal so as to increase production rates.

A number of HPP tests were conducted and the examples reflecting the post mortem glycolysis reduction are shown. The muscle was removed from the carcass. The meat was placed in a vacuum package that was subsequently lowered into the HPP vessel. The HPP vessel is then filled with water at a temperature of approximately 40° F., unless otherwise noted. A ramp up time of approximately ½ minutes brought the HPP vessel to its final pressure. All of the times listed are the time that the HPP vessel was at its final pressure.

Figure 2:
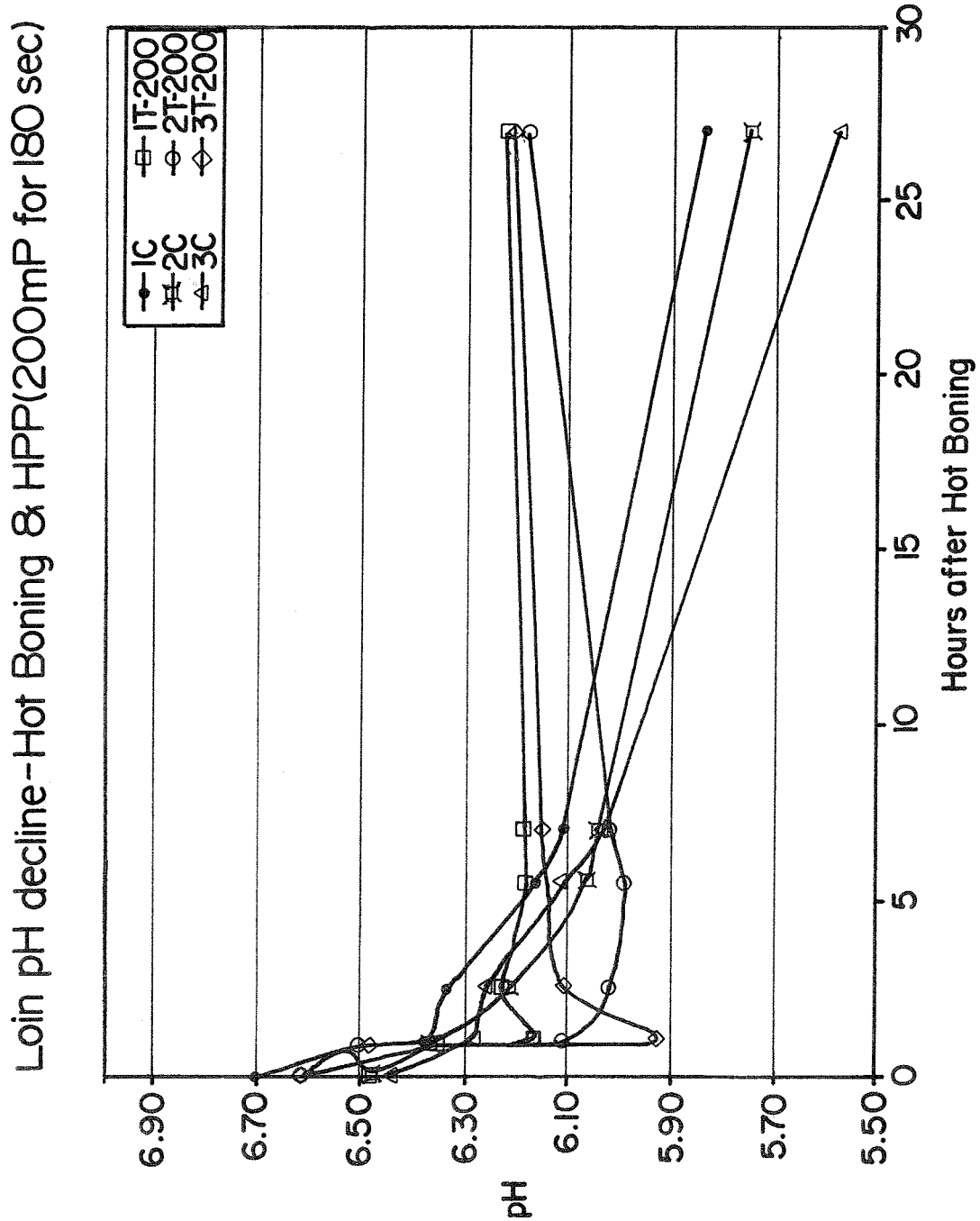
FIG. 2 is a graph showing the pH decline of pork loins subjected to high pressure processing at 200 MPa for 180 seconds.
Figure 3:
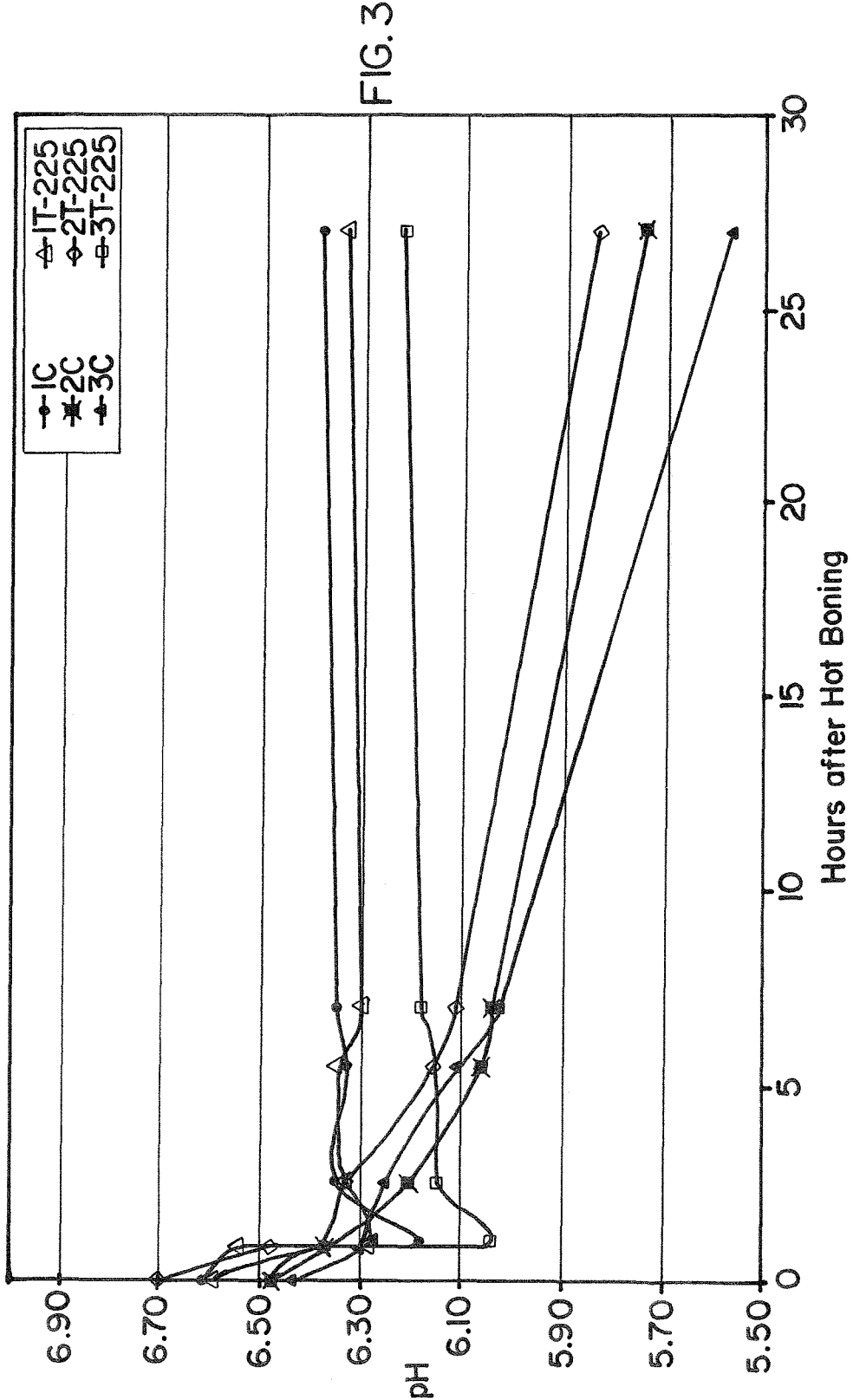
FIG. 3 is a graph showing the pH decline of pork loins subjected to high pressure processing at 225 MPa for 180 seconds.

In the first three examples, as shown in FIGS. 1-3, pre-rigor pork loins were tested approximately 105 to 135 minutes post mortem. The pressures used in Examples 1-3 were 175, 200 and 225 MPa respectively. In these examples, the loins were cut in half. One half of the loin from each pair was subjected to high pressure processing and the other half loins served as the control. For examples 1-3, control loins are labeled 1C, 2C and 3C and test loins are labeled 1T, 2T and 3T. Both the test and control loins were cooled for 24 hours at 34° F. The pH of both the control and the test loins were taken at various times as depicted in the graphs. The results show that the higher hold pressures resulted in higher 24-hour pH. It was also observed that pressures greater than 225 MPa can result in light muscle color, thus, there is a window of hold pressures and times that will produce ideal muscle quality. In example 1, high pressure processed test loins all had a higher 24-hour pH, but there was not as substantial a difference as with examples 2 and 3. As shown in FIG. 2, the three test loins in this second example all had a 24-hour pH of approximately 6.2, wherein the controls ranged from approximately 5.6 to 5.85. In the third example FIG. 3, all test loins had a 24-hour pH of between approximately 6.2 and 6.4, whereas the control loins had a 24-hour pH of from approximately 5.6 to approximately 5.8.

Figure 4:
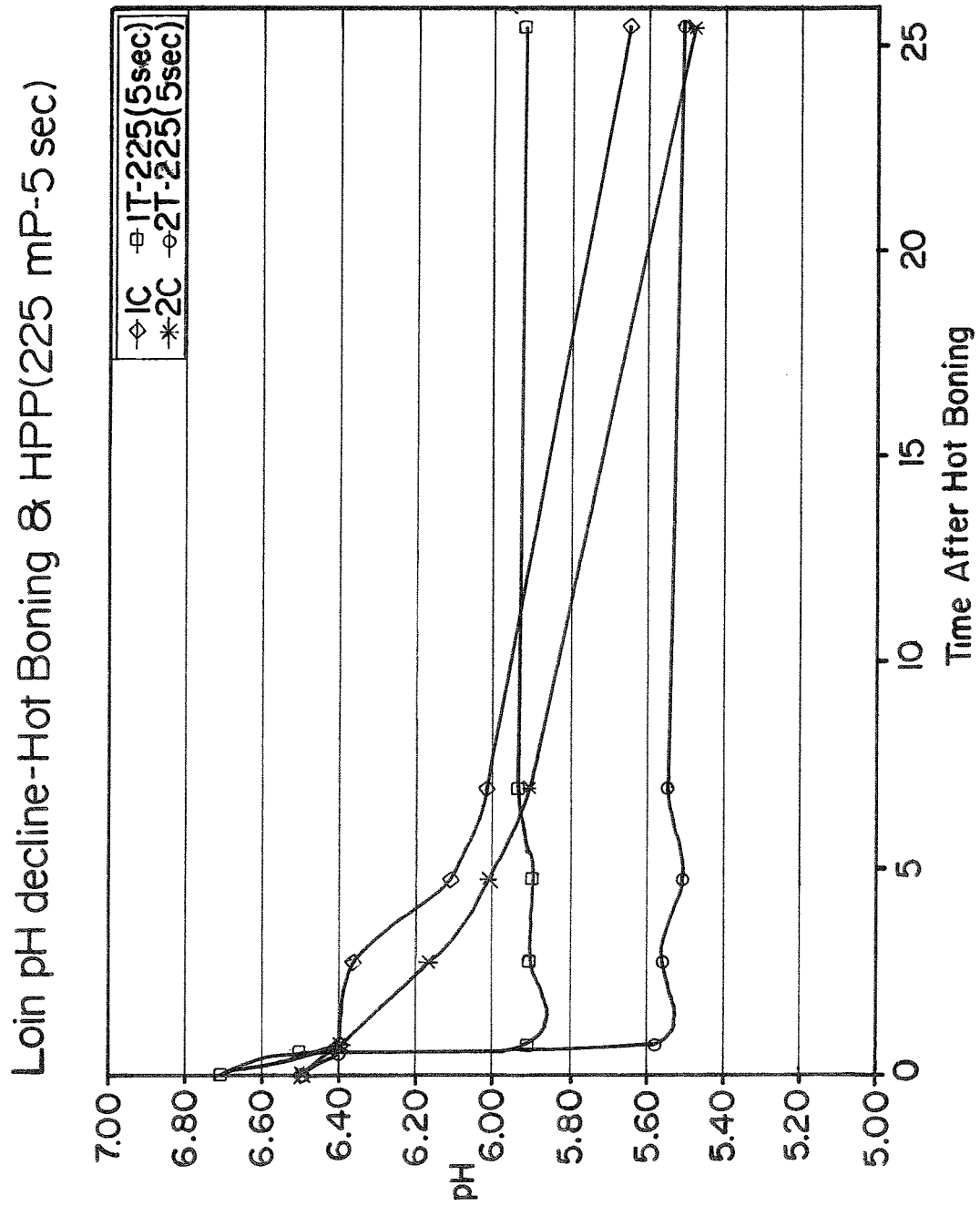
FIG. 4 is a graph showing the pH decline of pork loins high pressure processed at 225 MPa for 5 seconds.
Figure 5:
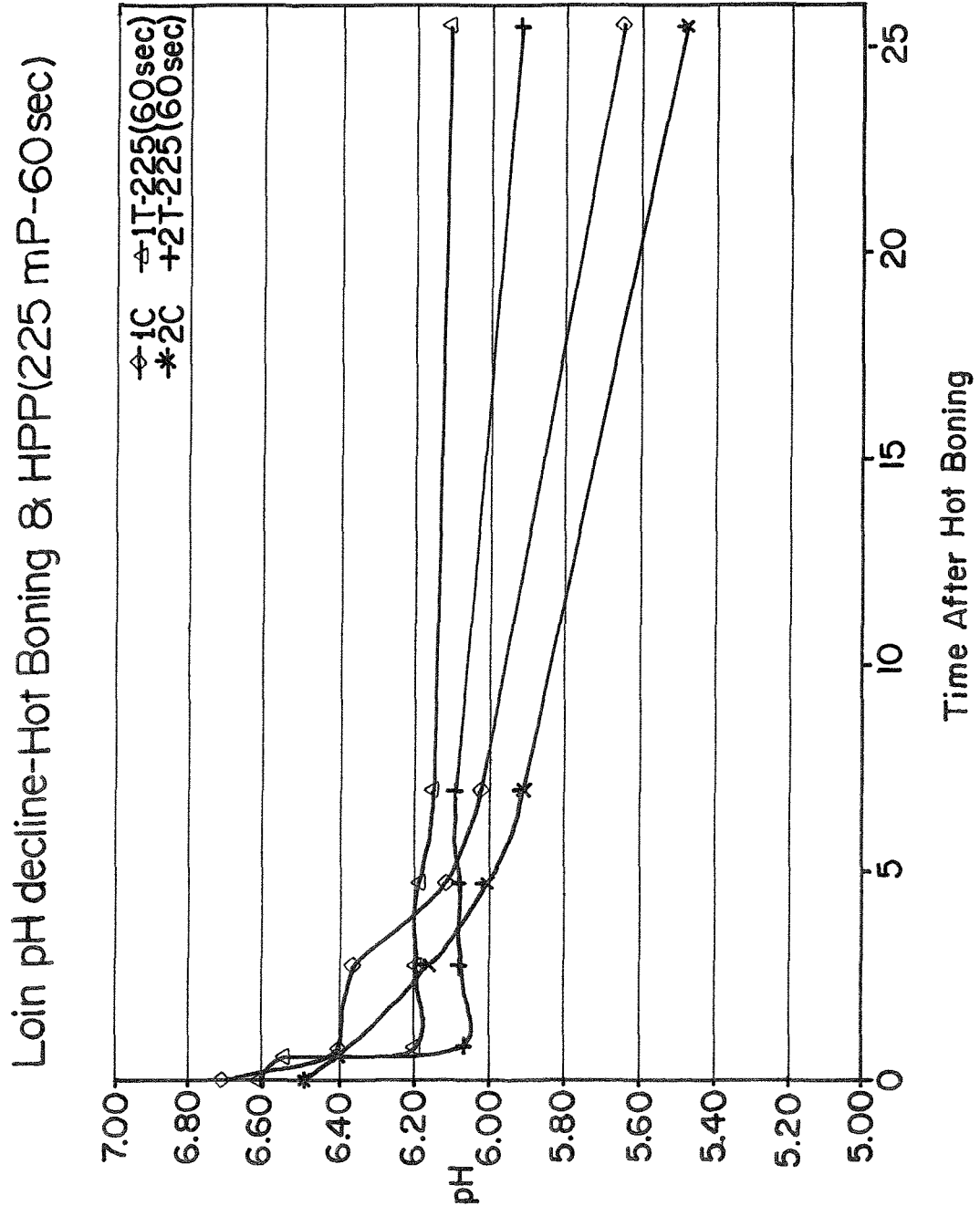
FIG. 5 is a graph showing the pH decline of pork loins high pressure processed at 225 MPa for 60 seconds.
Figure 6:
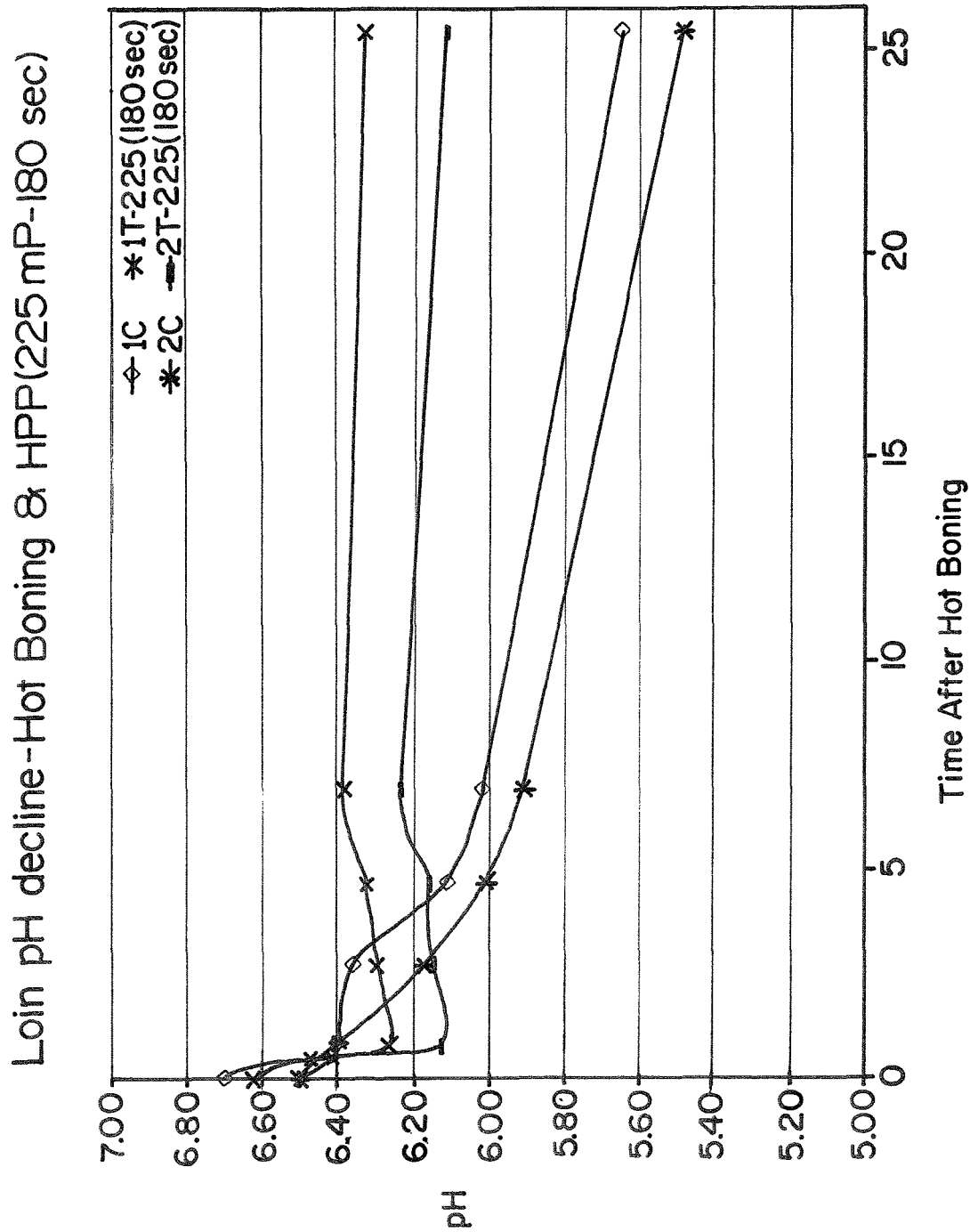
FIG. 6 is a graph showing the pH decline of pork loins high pressure processed at 225 MPa for 180 seconds.

While the first three examples were all run for the same time, 180 seconds, the next three examples (4-6), shown in FIGS. 4 through 6, were conducted similarly except that pressure was constant at 225 MPa and hold time was varied from 5 seconds in the fourth example (FIG. 4) to 60 seconds in the fifth example (FIG. 5) and 180 seconds in the sixth example (FIG. 6). It can be seen in viewing these examples that the hold times influence 24-hour pH. For a hold time of 5 seconds there was little effect of HPP on 24-hour pH. However, when increased to 60 seconds, both test loins had significantly higher 24-hour pH of approximately 5.9 to 6.1 as compared to the control loins having a 24-hour pH of from approximately 5.5 to 5.7. Also shown, in FIG. 6, it can be seen that HPP increased 24-hour pH from approximately 5.5 to 5.7 for control loins to a 24-hour pH of 6.1 to 6.3 for test loins.

Figure 7:
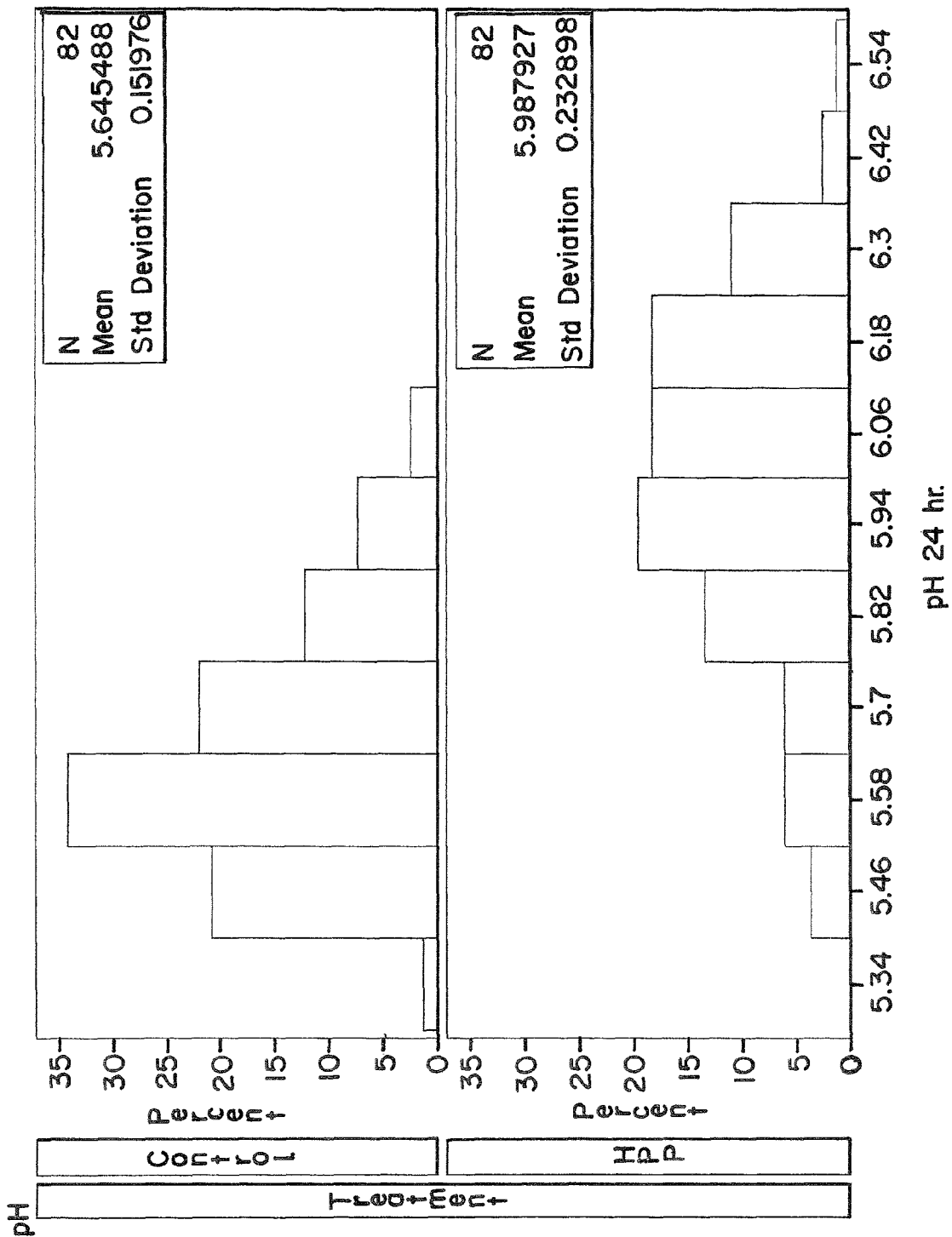
FIG. 7 is a graph showing the 24-hour pH of high pressure processed pork loins and control pork loins.

In examples seven and eight (FIGS. 7-8), 82 paired loins were utilized. Test loins were high pressure processed at 225 MPa for 60 seconds approximately 110 minutes post mortem. Control loins were left on the carcass and collected the following day to prevent potential confounding of results with those expected from cold shortening (pertinent to tenderness evaluation in Example 10). FIG. 7 illustrates 24-hour pH differences between the test group (T) and the control group (PC). The test loins had an average pH of 5.99, a 0.3 unit improvement compared to an average of 5.65 for the control loins.

Figure 8:
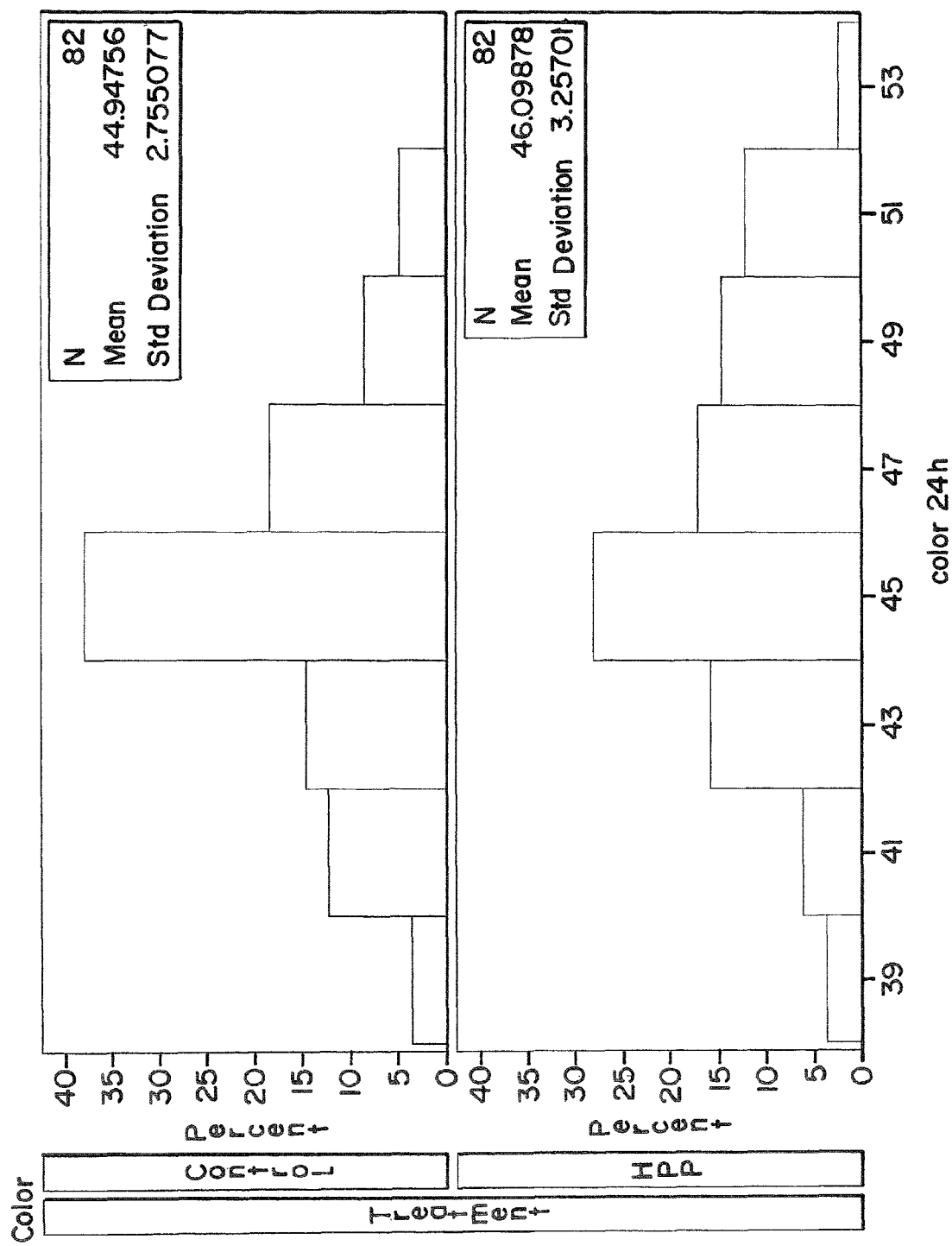
FIG. 8 is a graph showing the 24-hour color of high pressure processed pork loins and control pork loins.

Color differences, as measured by Minolta L* values, are shown in FIG. 8. L* values of the test loins were 46.1 and L* value of the control loins was 44.5. The higher L* value (a measure of lightness or darkness, well known in the art) for the HPP loins reflects a slightly paler color but this value is still within an acceptable color range as previously described.

Figure 9:
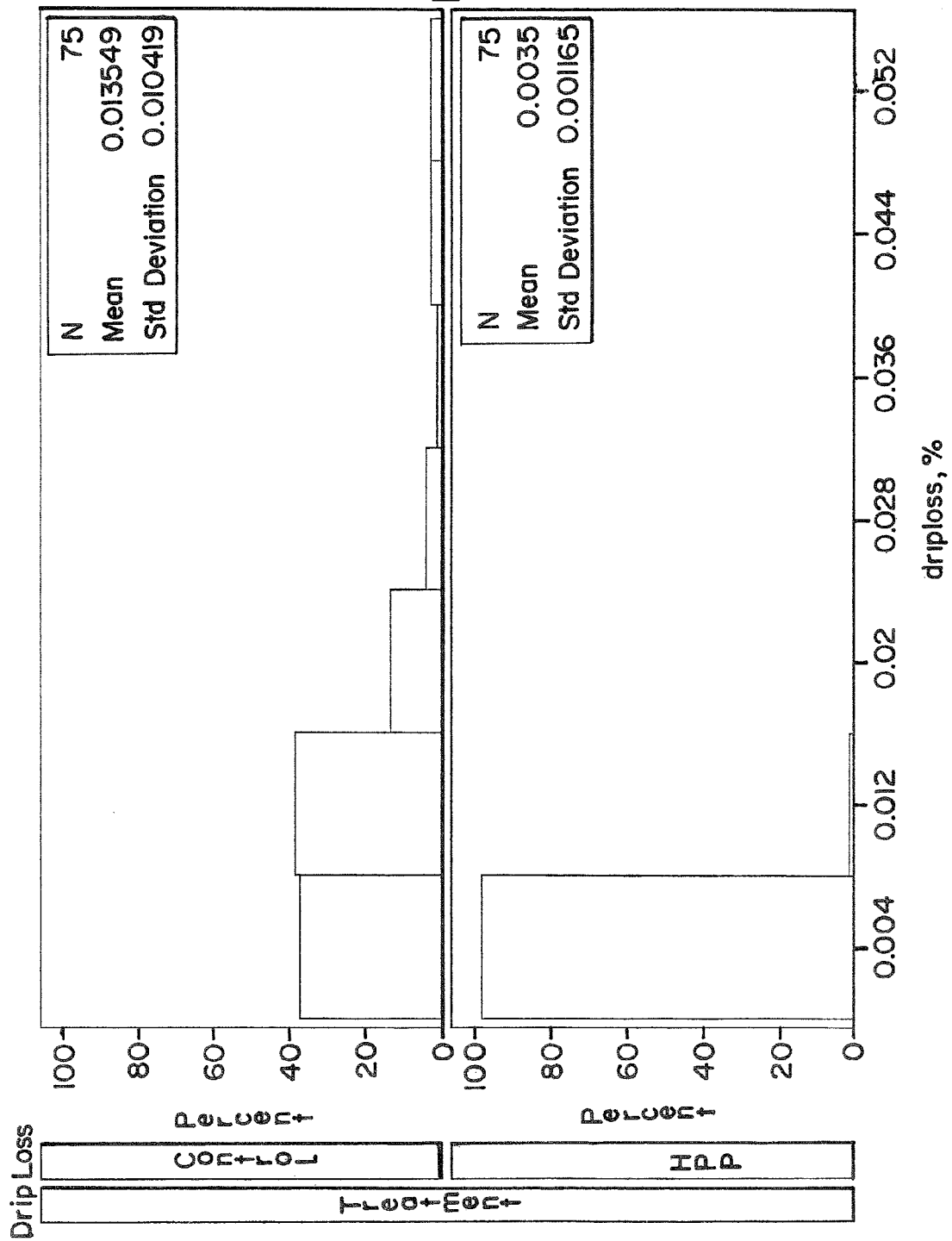
FIG. 9 is a graph showing the 24-hour drip loss of high pressure processed pork loins and control pork loins.

FIG. 9 shows the effect of HPP on loin drip loss. This test was conducted on 75 of the paired loins used in examples 7 and 8 and demonstrated that HPP reduced loin drip loss to 0.35% for the test loins compared to 1.35% drip loss for the control loins.

Figure 10:
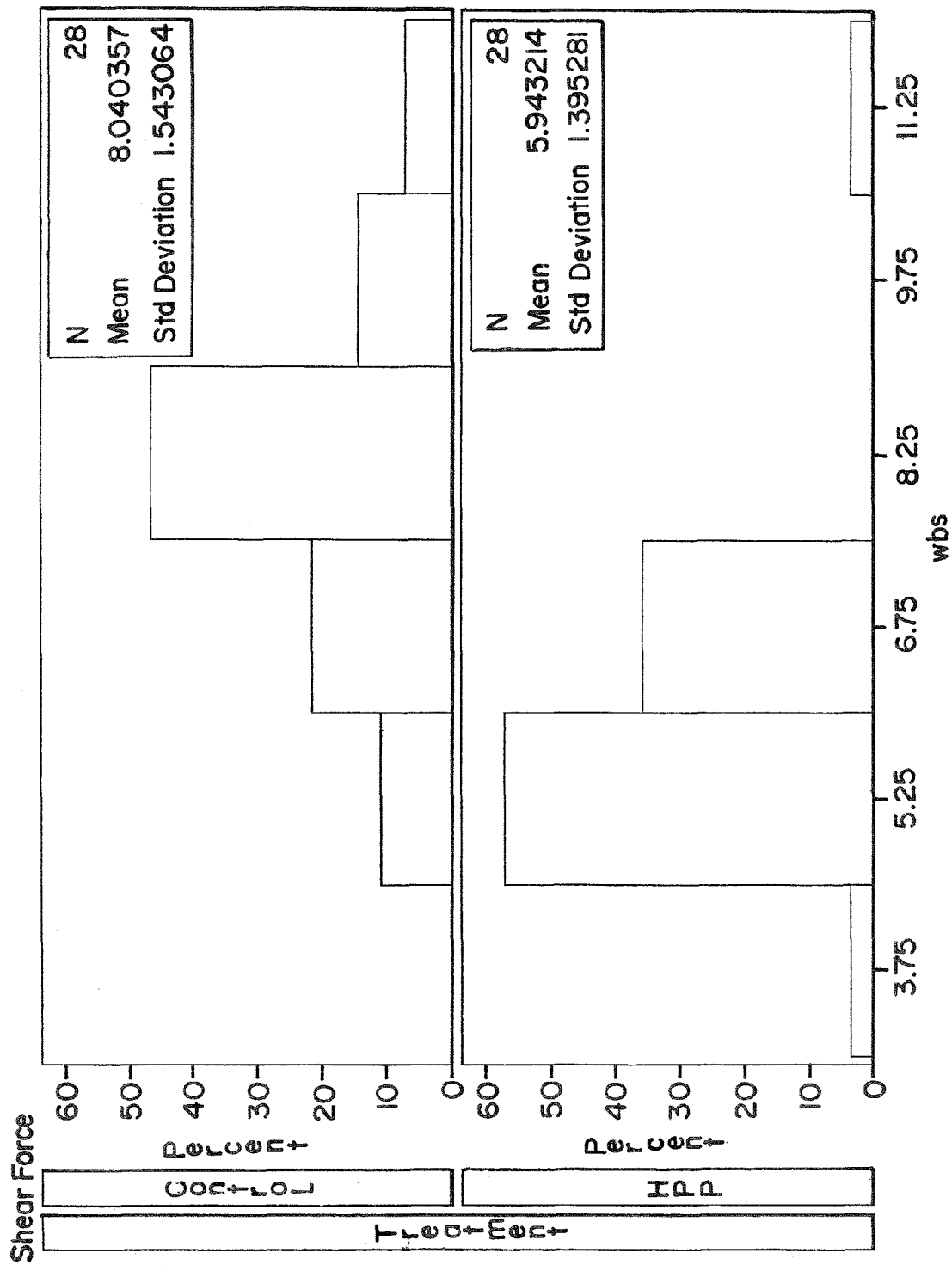
FIG. 10 is a graph showing the 24-hour shear force of high pressure processed pork loins and controlled pork loins.

Finally, 28 of the paired loins used in examples 7 and 8 were evaluated for shear force as a measurement of tenderness (FIG. 10). Test loins had a mean Warner Bratzler Shear Force (WBS) value of 5.94 pounds as compared to the mean value of 8.04 pounds for the control loins. This is a marked improvement in tenderness.

While the foregoing examples indicate the effectiveness of the high pressure processing, an additional eighth example was also done to chemically quantify these results based on the amount of glucose and lactic acid in the muscle at 24 hours. Higher levels of glucose and subsequent lower levels of lactic acid indicate glycolysis has been stopped. Additional tests were conducted with 10 paired loins. In each pair, one loin was used as a control and the other loin served as a test. The test loins were processed at 225 MPa pressure for 60 seconds. As shown in Table 1, in the first column, it can be seen that the glucose level of the control loins was 6.8 whereas the glucose levels of the test loins were 15.28. Therefore, it can be seen that the glucose levels of the test loins were over twice as high as the control loins, indicating that the glucose was not converted to lactic acid, which causes the pH decline in post mortem meat. Column 3 represents the difference of the test loins compared to the control loins. In columns 4 through 6, it can be seen that the control loins had a lactic acid level of 85.78 and the test loins had a lactic acid level of 74.94 or 10.83 less. Again, this indicates a lower lactic acid level in the test loins which relates to a higher 24-hour pH level. Finally, in columns 7 through 9 it can be seen that the control loins had a 24-hour pH after of 5.68 as compared to a 24-hour pH of 6.15 for the test loins for an increase of 0.46 units. These results demonstrate that post mortem glycolysis has been halted in the test loins.

The eleventh example is the final example for the turkey tests. In this example, 36 hens were utilized. Eighteen hens were used as controls and 18 hens served as test birds. The birds were high pressure processed 15 minutes after harvesting. Three different high pressure processing hold pressures (200, 275 and 350 MPa) were used to develop a range of results (6 test birds per pressure). The water temperature

TABLE 1

| | Column | | | | | | | | |
|---|---|---|---|---|---|---|---|---|---|
| Carcass ID | 1 Control Glucose (umol/ml) | 2 Test Glucose (umol/ml) | 3 Test-Control Glucose | 4 Control Lactic Acid (umol/ml) | 5 Test Lactic Acid (umol/ml) | 6 Test-Control Lactic Acid | 7 Control 24-hour pH | 8 Test 24-hour pH | 9 Test-Control 24-hour pH |
| 1 | 10.44 | 19.05 | 8.61 | 103.64 | 86.50 | −17.14 | 5.46 | 6.04 | 0.58 |
| 3 | 5.40 | 16.37 | 10.97 | 85.64 | 78.09 | −7.54 | 5.75 | 6.08 | 0.33 |
| 4 | 5.40 | 8.41 | 3.01 | 77.93 | 76.00 | −1.93 | 5.88 | 6.07 | 0.19 |
| 5 | 6.49 | 16.38 | 9.89 | 82.05 | 71.57 | −10.47 | 5.69 | 6.22 | 0.53 |
| 6 | 5.31 | 13.44 | 8.13 | 79.04 | 63.95 | −15.09 | 5.71 | 6.29 | 0.58 |
| 7 | 4.94 | 14.86 | 9.92 | 75.88 | 64.64 | −11.24 | 5.87 | 6.49 | 0.62 |
| 8 | 9.53 | 18.79 | 9.26 | 97.64 | 87.89 | −9.75 | 5.41 | 5.73 | 0.32 |
| 10 | 6.89 | 14.93 | 8.04 | 84.39 | 70.91 | −13.49 | 5.7 | 6.24 | 0.54 |
| Average | 6.80 | 15.28 | 8.48 | 85.78 | 74.94 | −10.83 | 5.68 | 6.15 | 0.46 |

Figure 11:
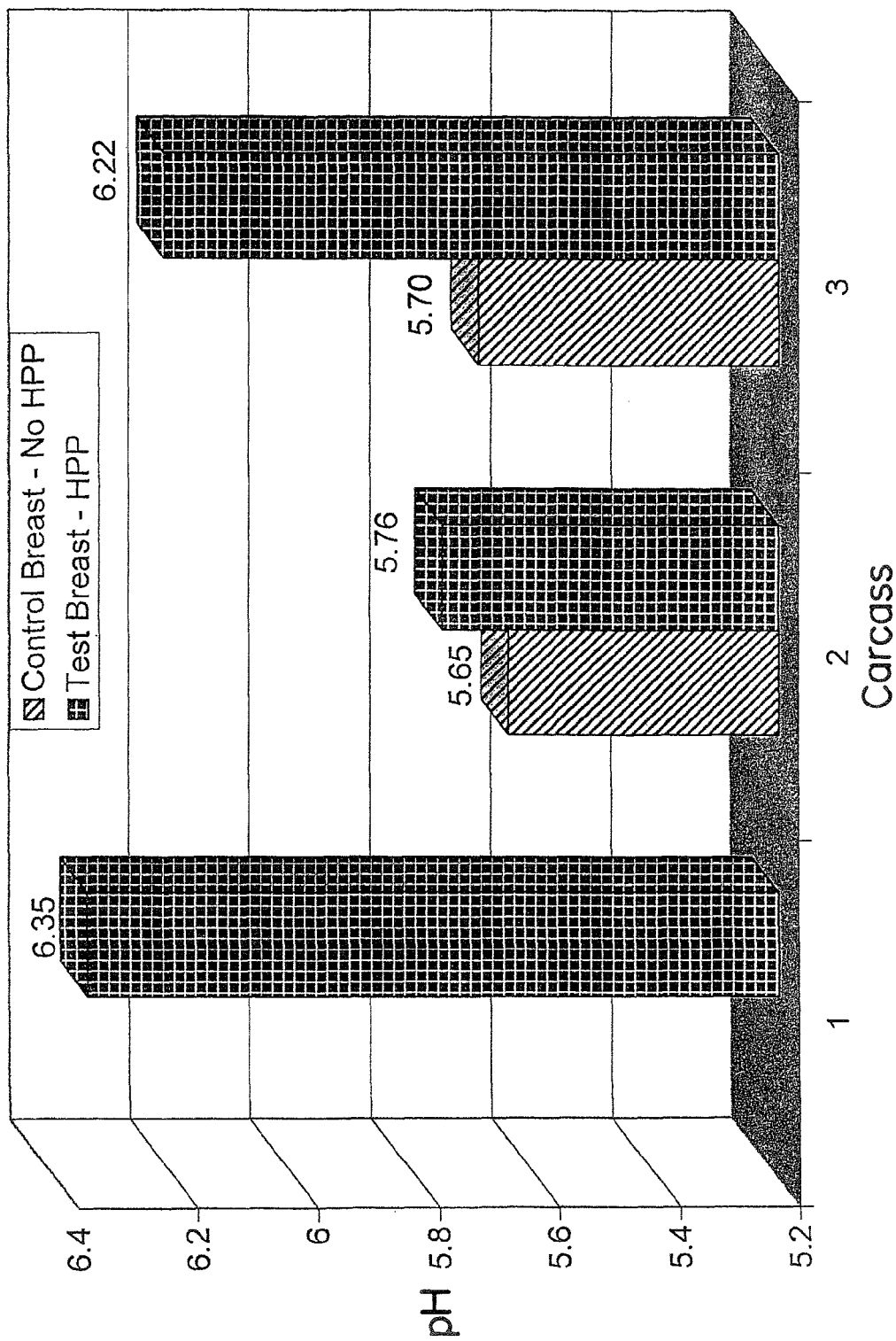
FIG. 11 is a graph of the results of 24-hour turkey breast pH.
Figure 12:
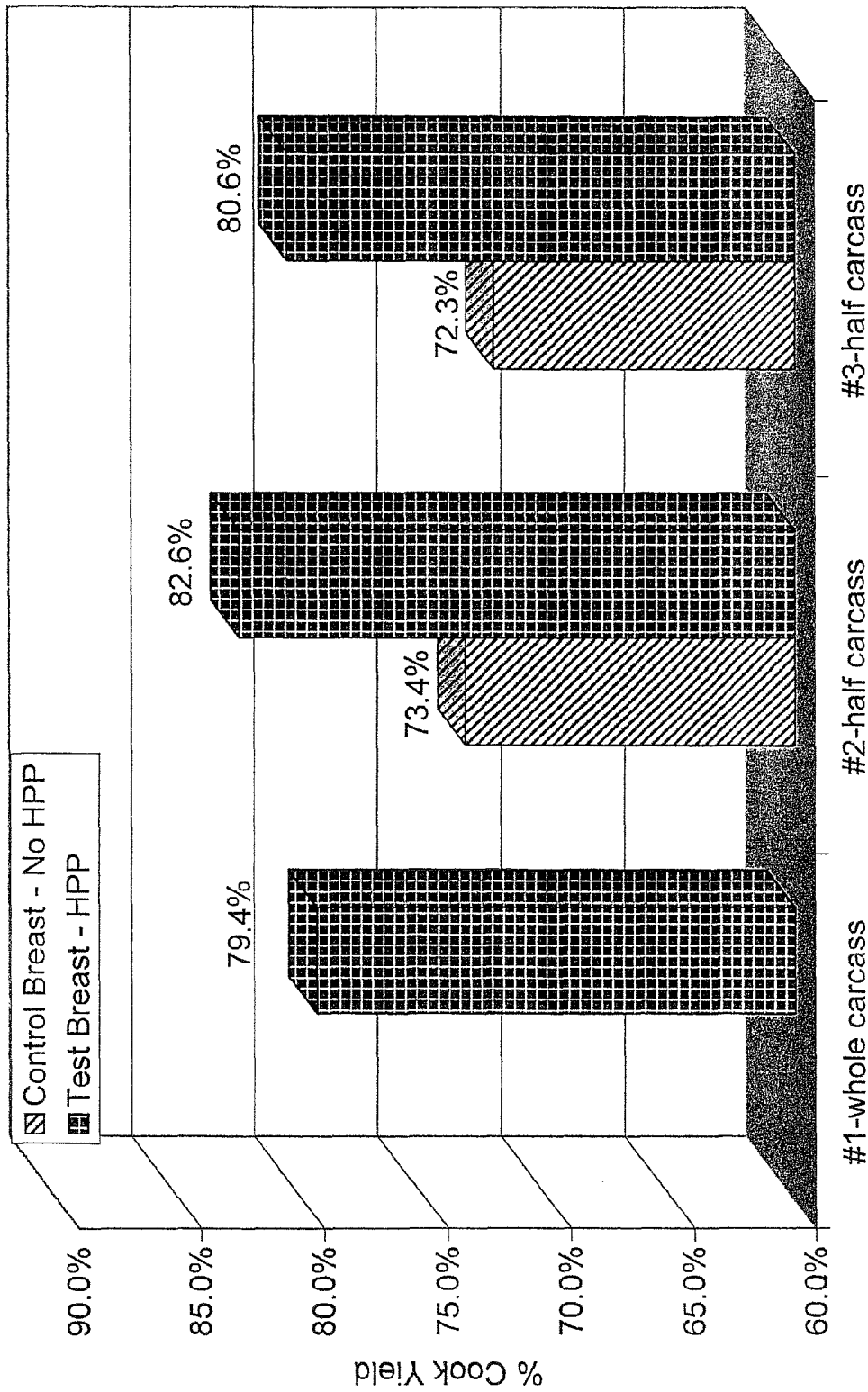
FIG. 12 is a graph showing the results of the same test as shown in FIG. 11, but reflecting the cook yield.

In addition to the foregoing examples for use of high pressure processing with pork, several tests were conducted with respect to the use of high pressure processing for improving turkey meat. In this ninth example, three turkey hens were harvested. Each of the turkey hens weighed between 10 and 15 pounds. A first bird carcass was subjected to high pressure processing as a whole. The other two hen carcasses were cut in half, after bleeding, and one half was subjected to high pressure processing and the other half served as a control. In each of the instances where the turkeys were subjected to high pressure processing, the water temperature used in the high pressure processing was at 45° F. and the pressure was 225 MPa and the hold time was for 60 seconds. The high pressure processing treatment occurred approximately 20 minutes after exsanguination. FIGS. 11 and 12 show the results of the tests run in this example.

In this example, the test showed that pre-rigor HPP stops post mortem glycosis and increases the 24-hour pH. The whole bird had a 24-hour pH of 6.35; there was no control with respect to this test. For the second and third tests, it can be seen that there was an increased pH of 5.76 vs. 5.65 and 6.22 vs. 5.7 comparing test to control respectively. Referring to FIG. 12, it can be seen that the cook yield of the HPP breasts was 79.4%, 82.6% and 80.6%. This is in contrast to a cook yield of 73.4% and 72.3% for the control breasts.

Figure 13:
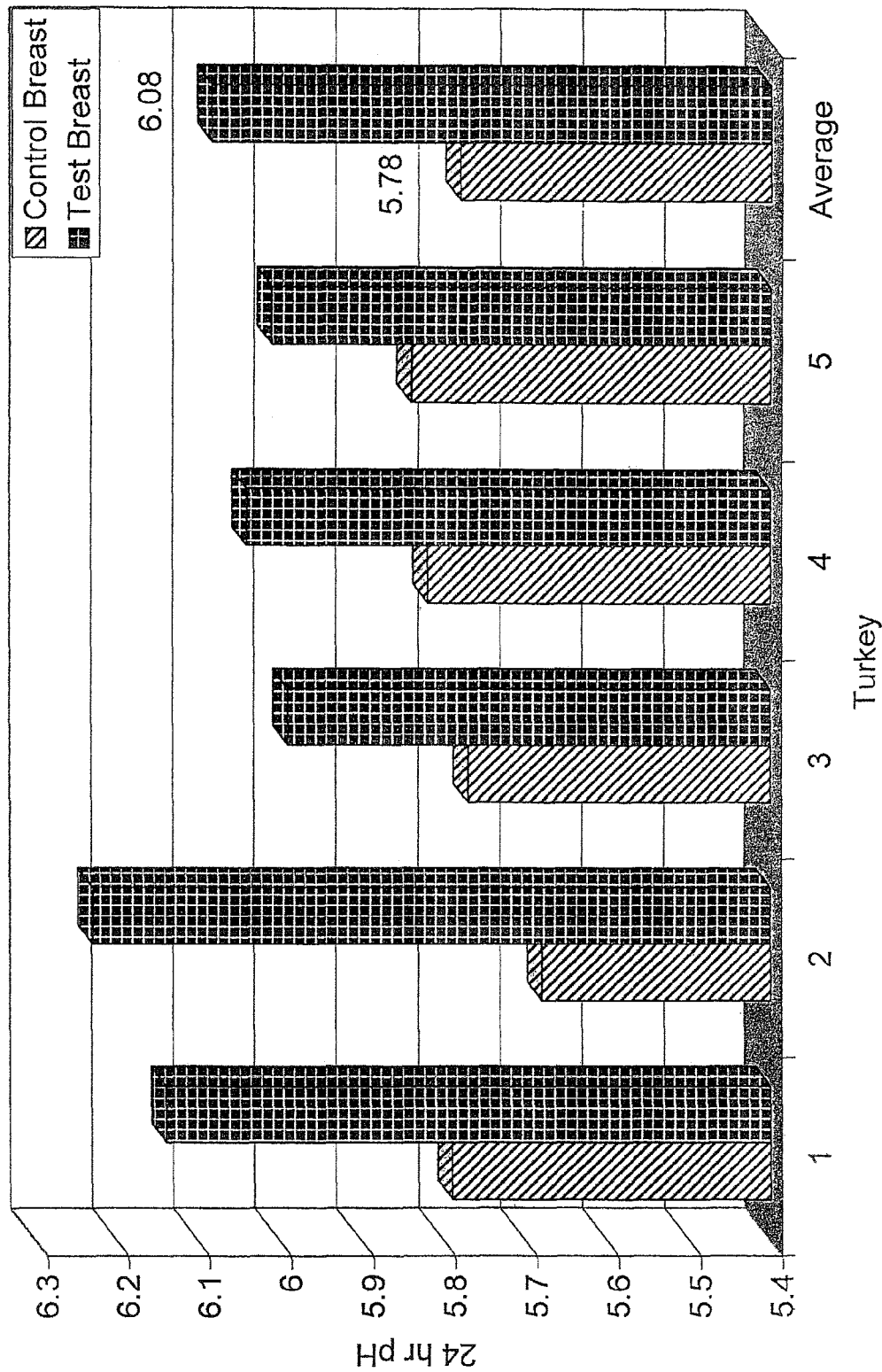
FIG. 13 is a graphical representation of the 24-hour pH of turkey breasts shown in example 9.
Figure 14:
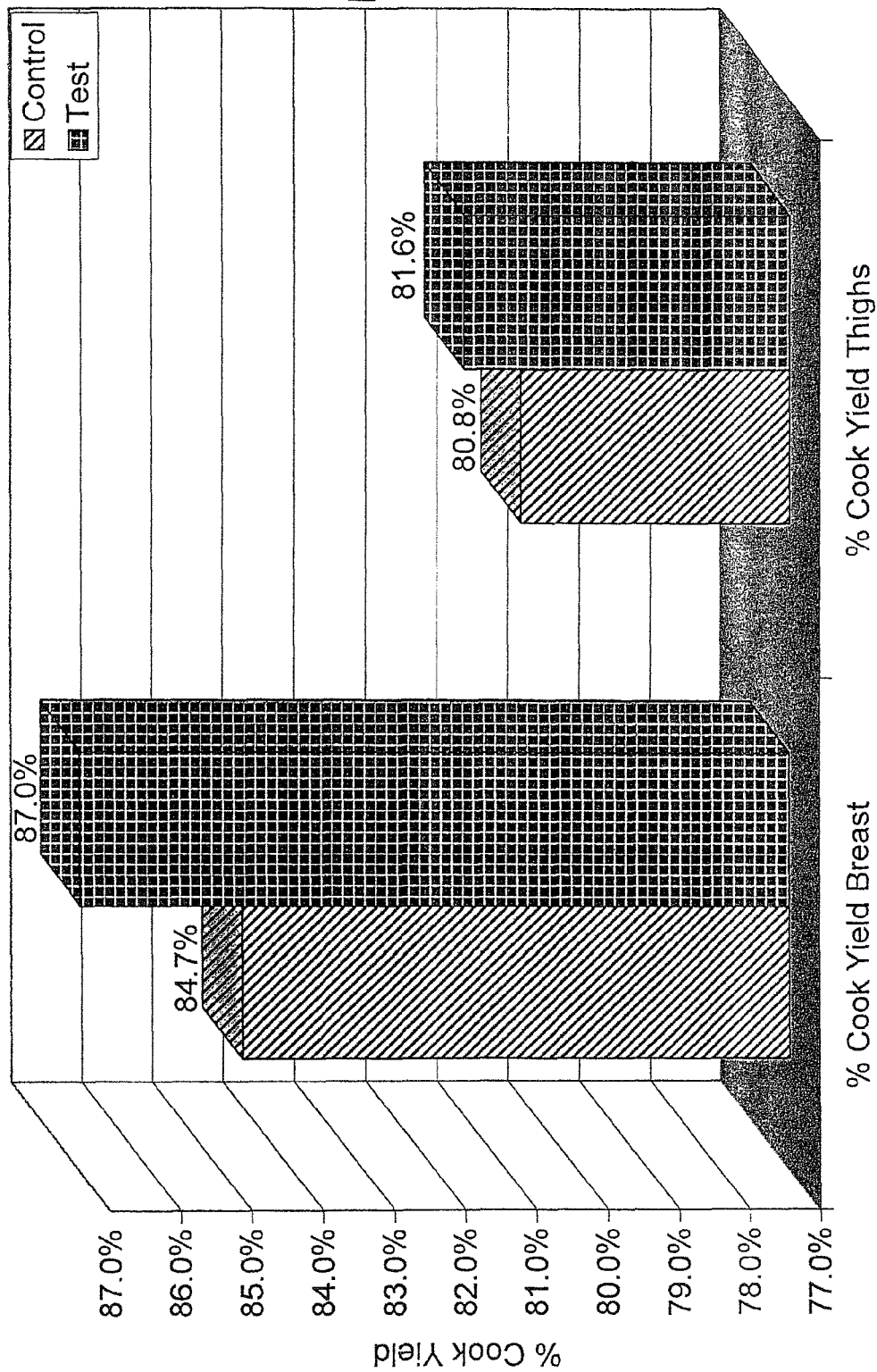
FIG. 14 is the percent cook yield results in the ninth example.

In the tenth example, five toms weighing between 30 and 40 pounds were harvested. Both breasts and thighs from each tom carcass were hot boned and labeled to keep their identity. One breast and one thigh from each carcass were high pressure processed at 225 MPa for 60 seconds with a water temperature of 45° F. The other one half breast and other thigh served as controls. The HPP treatment occurred approximately 10-15 minutes after exsanguination. The results of this test are shown in FIGS. 13 and 14.

It can be seen that the 24-hour pH of the test breasts is 6.08 as compared to the 5.78 pH of the control breasts. In FIG. 14, it can be seen that the average cook yield of the breasts was 87.0% compared to 84.7% for the control for the breasts. For the thighs, cook yields increased 80.8% for the control to 81.6% for the test.

for all testing was 95° F. and the hold time was 15 seconds. Results are shown in FIGS. 15 and 16.

Figure 15:
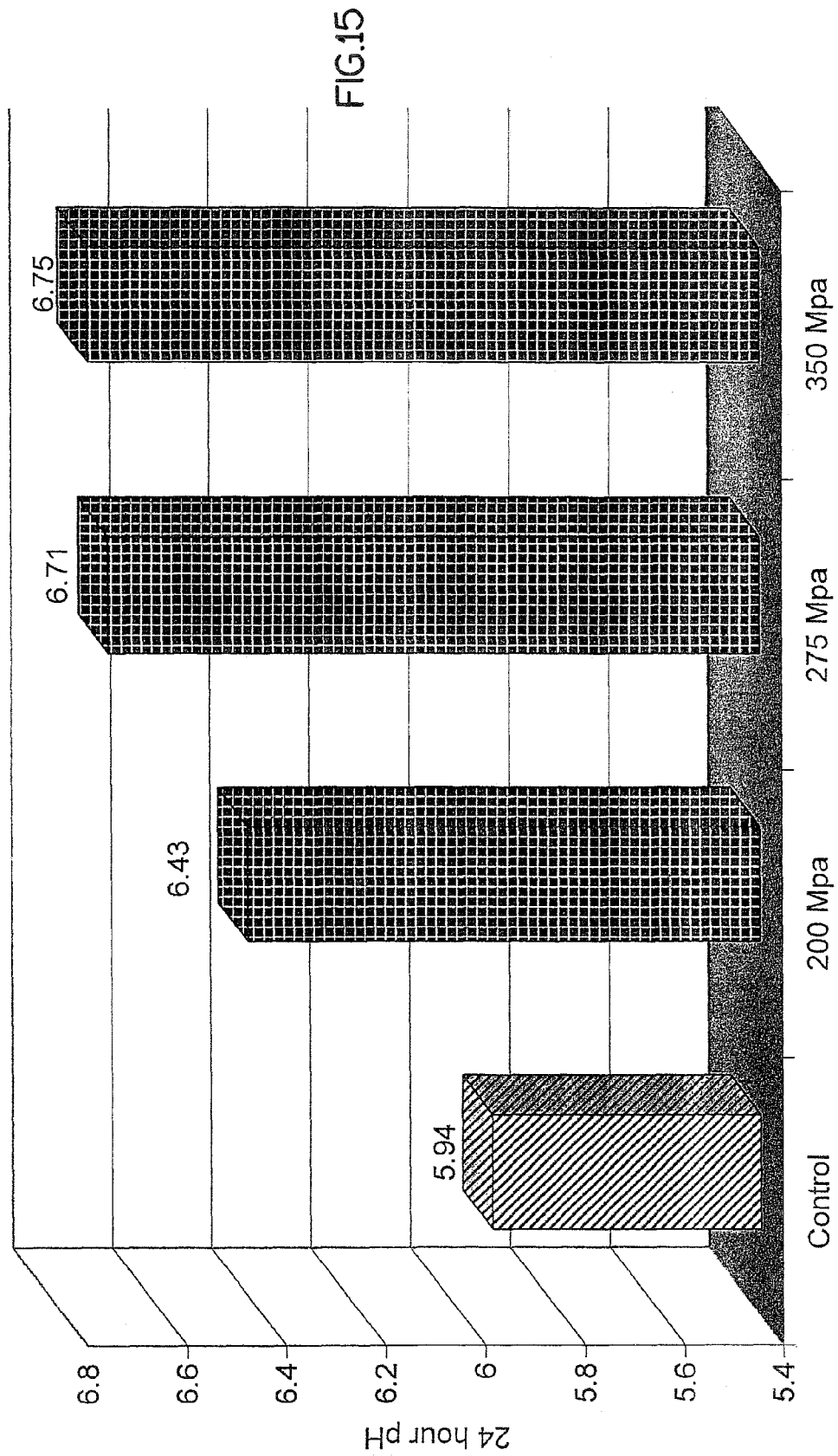
FIG. 15 is a graphical representation of the results of the 24-hour pH of example 10.
Figure 16:
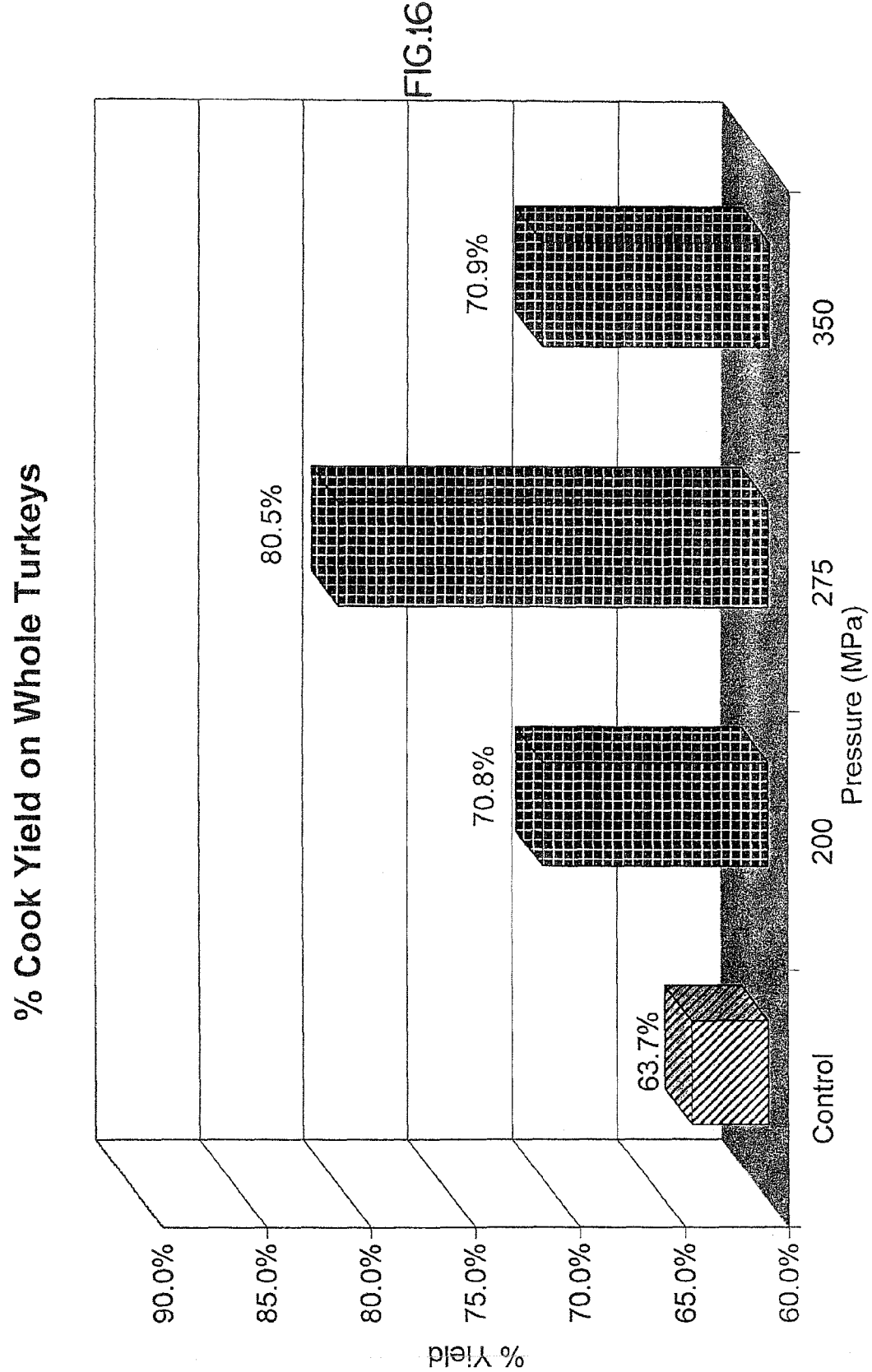
FIG. 16 is the graphical results of the percent cook yield of the tests in example 10.

As can be seen in FIG. 15, the 24-hour pH improved from the control pH of 5.94 and increased as pressure increased. However, there appears to be a diminishing return between the pressures of 275 MPa and 350 MPa. In FIG. 16, the percentage cook yield for the test also shows an increase from the control. There, the best yield was observed at 275 MPa, which was 80.5%. The percent cook yield at 200 MPa was 70.8% and at 350 MPa was 70.9%.

Figure 17:
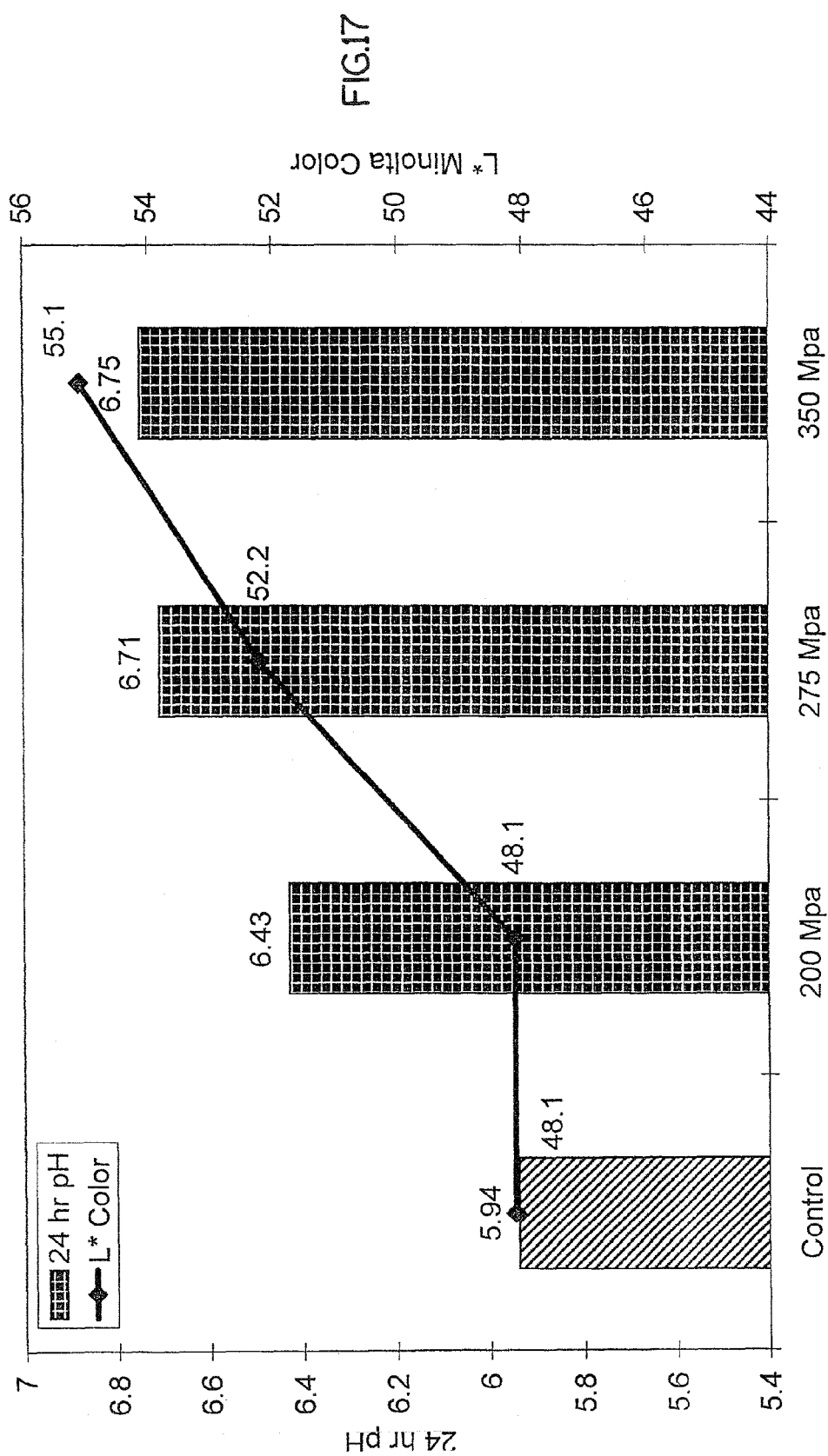
FIG. 17 is a graphical representation of the color values and 24-hour pH of example 10.

The color of the breast meat was only measured in example eleven. The color of the breast meat, as measured by Minolta L* value also increased. This result is shown in FIG. 17. It can be seen that the color values also increased at the levels above 200 MPa.

Figure 18:
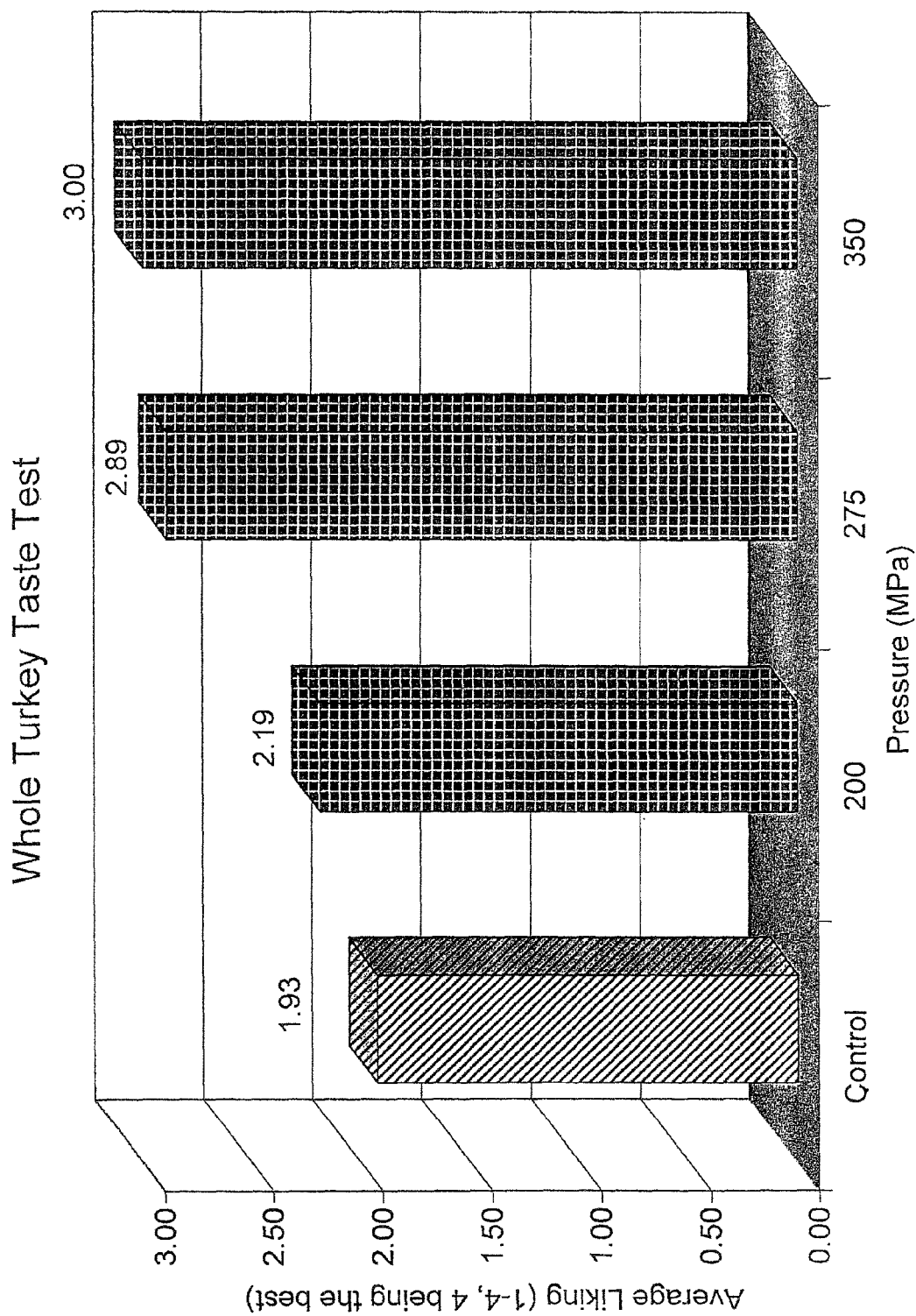
FIG. 18 is a graphical representation of the results of the taste panel for example 10.

Finally, an informal consumer taste test panel was performed using four of the whole birds from example eleven. The birds consisted of a control bird and three test birds, one at each of the hold pressures. Birds were cooked to a temperature of approximately 170° F. in a convection oven. The birds were served as blind as part of a taste test. Twenty-seven participants ranked the turkey 1-4, with 4 being the best and 1 being the worst. The results of the taste test are shown in FIG. 18.

As can be seen, the average score was higher for each one of the birds that were high pressure processed. The control had the lowest mean score of 1.93. This is compared to the high pressure processed birds that had values of 2.19, 2.89 and 3.0.

The pH improvement shown in the high pressure processed birds correlates to and explains the improvement in cook yields and in the taste panel results.

In addition to the previous examples, several tests were conducted with respect to the use of high pressure processing for improving beef quality. It has also been found that high pressure processing of beef also reduced post mortem glycolysis. Because post mortem glycolysis is slower in beef than in pork or turkey, more time was available post mortem to high pressure process beef. The extra time allows processors to potentially break the beef carcass into primals, if desired. This will significantly reduce the operational complexities and costs.

TABLE 2

| | Control Average Shear Force lbs. | Test Average Shear Force lbs. | Control 17 day pH | Test 17 day pH | Control % Cook Yield | Test % Cook Yield |
|---|---|---|---|---|---|---|
| Eye of round | 9.215 | 7.255 | 5.61 | | 71.7% | 83.3% |
| Rib eye | 6.66 | 3.545 | 5.64 | 6.25 | 78.1% | 82.0% |
| Strip | 8.78 | 3.125 | 5.67 | 6.24 | 76.4% | 83.1% |
| Tenderloin | 4.715 | 2.635 | 5.65 | 6.46 | 75.1% | 80.0% |
| Top round | 9.03 | 4.465 | 5.57 | 6.15 | 71.4% | 80.3% |
| Average | 7.68 | 4.21 | 5.63 | 6.28 | 74.6% | 81.7% |

Several beef tests were run and it was found that pressures of 175 and 215 MPa at hold time of 15 seconds was not sufficient to stop post mortem glycolysis in beef. As shown in example 12 (Table 2), five different cuts of beef were tested. The five cuts were eye of round, ribeye, strip, tenderloin and top round. All were processed in the high pressure processing vessel at 350 MPa (higher than the previous test of 215 MPa) and a hold time of 15 seconds. The water temperature used was 95° F. The higher pH of the test samples result in better water holding capacity, as demonstrated by improved cook yields. The shear force tests were conducted at 21 days. The difference in shear force between test and control samples stands out as one of the more significant differences. The shear force of the test top round is similar to that of the control tenderloins. It can be seen that in all instances, the amount of force necessary to cut the test beef was significantly less and the test beef was more tender compared to the control sample. Further, the pH of the tests and control at 17 days showed significantly higher values for the tests compared to the controls. Finally, the cook yield was also substantially improved for the test beef compared to the control beef.

As a result of these studies, it has been determined that it is preferable, for pork, that the pressure in the high pressure processing vessel be at least 175 MPa, preferably from 175 MPa to 250 MPa and more preferably from 215 MPa to 250 MPa. Further, it is preferred that the pork have a temperature of at least 65° F. when subjected to the high pressure processing and the high pressure processing should preferably take place within 8 hours post mortem. While it is preferred that the processing time in the high pressure processing vessel be 20 minutes or less, it is preferred that it is 10 minutes or less, more preferably 1 minute or less and most preferably at 15 seconds.

For processing turkey, it has been found that it is preferable that the pressure be at least 175 MPa, preferably 175 MPa to 350 MPa and more preferably from 275 MPa to 350 MPa. Although, it is recognized that a pressure of 350 MPa or greater may also be utilized. It is preferred that the turkey have a temperature of at least 65° F. when subjected to the high pressure processing and that the high pressure processing take place within 8 hours post mortem. It is preferred that the processing time in the high pressure vessel be 20 minutes or less, preferably 10 minutes or less and more preferably 1 minute or less.

For processing beef, it has been found that it is preferable that the pressure be at least 215 MPa, and preferably from 215 MPa to 350 MPa, and most preferably 350 MPa. It is preferred that the beef be processed within 24 hours post mortem and preferably at a temperature of at least 65° F. It is preferred that the time at the pressure level be 20 minutes or less, preferably 10 minutes or less and more preferably 1 minute or less.

For all the species of meat, it has been found that the benefits have been found at 0 seconds or greater. This is because there is the ramp up time of approximately 1½ minutes to the pressure of the high pressure processing vessel. This ramp up time provides benefit in the quality of meat of all of the species.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of processing pre-rigor meat, comprising subjecting the meat to high pressure processing at a pressure of at least 175 MPa for a time of 20 minutes or less, wherein post mortem glycolysis is stopped.

2. A method of processing pre-rigor pork, comprising subjecting the pork to high pressure processing at a pressure of at least 175 MPa for a time of 20 minutes or less, wherein post mortem glycolysis is stopped.

3. The method of claim 2, wherein the pork has a temperature of at least 65° F. when the pork is subjected to high pressure processing.

4. The method of claim 2, wherein the pork is subjected to high pressure processing within 8 hours of post mortem.

5. The method of claim 2, wherein the pressure is from 175 MPa to 250 MPa for a time of 20 minutes or less.

6. The method of claim 2, wherein the pressure time is 10 minutes or less.

7. The method of claim 2, wherein the pressure time is 1 minute or less.

8. A method of processing pre-rigor turkey, comprising subjecting the turkey to high pressure processing at a pressure of at least 175 MPa for a time of 20 minutes or less, wherein post mortem glycolysis is stopped.

9. The method of claim 8, wherein the turkey has a temperature of at least 65° F. when the turkey is subjected to high pressure processing.

10. The method of claim 8, wherein the turkey is subjected to high pressure processing within 8 hours of post mortem.

11. The method of claim 8, wherein the pressure is from 175 MPa to 350 MPa for a time of 20 minutes or less.

12. The method of claim 8, wherein the pressure time is 10 minutes or less.

13. The method of claim 8, wherein the pressure time is 1 minute or less.

14. A method of processing pre-rigor beef, comprising subjecting the beef to high pressure processing at a pressure of at least 215 MPa for a time of 20 minutes or less, wherein post mortem glycolysis is stopped.

15. The method of claim 14, wherein the beef has a temperature of at least 65° F. when the beef is subjected to high pressure processing.

16. The method of claim 14, wherein the beef is subjected to high pressure processing within 24 hours of post mortem.

17. The method of claim 14, wherein the pressure is from 215 MPa to 350 MPa for a time of 20 minutes or less.

18. The method of claim 14, wherein the pressure time is 10 minutes or less.

19. The method of claim 14, wherein the pressure time is 1 minute or less.

20. A method of processing pre-rigor beef, comprising:
a) placing a beef carcass or a portion thereof in a high pressure processing vessel; and
b) subjecting the beef carcass or a portion thereof to a pressure of at least 325 MPa or greater for a hold time of 15 seconds or greater, wherein post mortem glycolysis is stopped.

\* \* \* \* \*